United States Patent
Gustafsson et al.

(10) Patent No.: US 12,451,272 B2
(45) Date of Patent: Oct. 21, 2025

(54) PRESSURIZATION AND HEATING DEVICE AND METHOD FOR INSULATION SYSTEM RESTORATION OF A POWER CABLE

(71) Applicant: NKT HV Cables AB, Lyckeby (SE)

(72) Inventors: Kristian Gustafsson, Karlskrona (SE); Jörn Antonischki, Fågelmara (SE)

(73) Assignee: NKT HV Cables AB, Lyckeby (SE)

(*) Notice: Subject to any disclaimer, the term of this patent is extended or adjusted under 35 U.S.C. 154(b) by 754 days.

(21) Appl. No.: 17/808,918

(22) Filed: Jun. 24, 2022

(65) Prior Publication Data
US 2022/0415542 A1    Dec. 29, 2022

(30) Foreign Application Priority Data
Jun. 28, 2021 (EP) .................................. 21182096

(51) Int. Cl.
*H01B 13/00* (2006.01)
*B29C 73/34* (2006.01)
(Continued)

(52) U.S. Cl.
CPC ......... *H01B 13/0016* (2013.01); *B29C 73/34* (2013.01); *F27B 5/04* (2013.01);
(Continued)

(58) Field of Classification Search
CPC . H02G 1/14; H02G 1/145; H02G 1/16; F27B 5/04; F27D 11/06; B29C 73/34;
(Continued)

(56) References Cited

U.S. PATENT DOCUMENTS

| | | | |
|---|---|---|---|
| 5,407,340 A | 4/1995 | Daguet et al. | |
| 10,410,766 B2 * | 9/2019 | Krogh | B23K 13/00 |
| 12,272,936 B2 * | 4/2025 | Rébillard | H02G 15/196 |

FOREIGN PATENT DOCUMENTS

| | | |
|---|---|---|
| CN | 109616962 A | 4/2019 |
| SE | 446571 B | 9/1986 |
| WO | 2016175806 A1 | 11/2016 |

OTHER PUBLICATIONS

European Office Action; Application No. 21182096.4; Issued: Apr. 9, 2025; 10 Pages.
(Continued)

*Primary Examiner* — Hung D Nguyen
(74) *Attorney, Agent, or Firm* — Whitmyer IP Group LLC

(57) ABSTRACT

A pressurisation and heating device for restoring an insulation system of a power cable, the pressurisation and heating device including: a first part including a first channel configured to receive a portion of the power cable, a second part including a second channel configured to receive a portion of the power cable, wherein the pressurisation and heating device is configured to be set in a closed state in which the first channel faces the second channel thereby forming a heating chamber extending from a first end to a second end, opposite the first end, of the pressurisation and heating device, wherein the pressurisation and heating device is configured to be pressurised to obtain a pressure higher than atmospheric pressure inside the heating chamber when the power cable is arranged sealed in the heating chamber, wherein the pressurisation and heating device has an at least 20 cm long axially extending section which is primarily made of material at most having a conductivity of the order of 1000 S/m at 20° C.

20 Claims, 2 Drawing Sheets

(51) Int. Cl.
  *F27B 5/04*   (2006.01)
  *F27D 11/06*  (2006.01)
  *B29L 31/34*  (2006.01)

(52) U.S. Cl.
  CPC ....... *F27D 11/06* (2013.01); *B29L 2031/3462* (2013.01); *F27M 2003/08* (2013.01)

(58) Field of Classification Search
  CPC .......... B29C 45/1671; B29C 45/14549; B29C 45/14639; B29C 45/2673; B29C 45/2701; B29C 45/2708; B29C 45/28; H01B 13/0016; H01B 13/14; F27M 2003/08; H01R 4/021; H01R 4/70; H01R 4/726; B29L 2031/3462; H05B 6/02; H05B 6/42; H05B 6/44
  See application file for complete search history.

(56)            References Cited

OTHER PUBLICATIONS

Lemaitre, Romuald, et al.; "High Pressure Moulding Technology"; Subtopic 2017; May 16, 2007; 5 Pages.
Extended European Search Report; Application No. 21182096.4; ompleted: Nov. 18, 2021; Issued: Nov. 29, 2021; 9 Pages.

\* cited by examiner

PRESSURIZATION AND HEATING DEVICE AND METHOD FOR INSULATION SYSTEM RESTORATION OF A POWER CABLE

TECHNICAL FIELD

The present disclosure generally relates to power cable jointing and equipment for the same.

BACKGROUND

During power cable manufacturing, it may be necessary to joint two cable lengths. This may for example be as a result of limitations on the maximum continuous cable length that can be produced in the factory, or because of unintended cable cuts.

When two cable lengths are joined in the factory, all the cable layers are removed down to the conductors at the cable ends. The conductor ends are then joined, for example by welding, thus forming a conductor joint. The insulation system around the conductor joint is then rebuilt layer by layer.

This is usually done by winding tape layer by layer. The insulation systems of the two cable ends are connected to the joint insulation system. Before the rebuilding process commences, the insulation system of the cable ends may be penciled, i.e. shaped conically tapering towards the conductor joint. The insulation system is restored in the same way in case a cable has been damaged during handling and needs to be repaired.

A device can be used for cross-linking the tape layers of the joint insulation system, or the restored insulation system of a cable that has been damaged. The joint insulation system is in this case placed inside the device, which is heated under pressure such that material in the tape layers melt together and become cross-linked without the creation of voids.

In case high frequency heating coils are employed for inner heating of the insulation system that is being restored during curing together with outer heating provided by the pressurisation and heating device, the insulation system outside the pressurisation and heating device is heated too because the high frequency heating coils that are arranged axially spaced apart from the pressurisation and heating device induce a current in the conductor radially inwards of the high frequency heating coils. A much larger portion of the insulation system is thus heated than would be required for curing the insulation system that is being restored. This may affect the insulation system performance.

SUMMARY

A general object of the present disclosure is to provide a pressurisation and heating device and a method of restoring the insulation system of a power cable, which solve or at least mitigate the problems of the prior art.

There is hence according to a first aspect of the present disclosure provided a pressurisation and heating device for restoring an insulation system of a power cable, the pressurisation and heating device comprising: a first part comprising a first channel configured to receive a portion of the power cable, a second part comprising a second channel configured to receive a portion of the power cable, wherein the pressurisation and heating device is configured to be set in a closed state in which the first channel faces the second channel thereby forming a heating chamber extending from a first end to a second end, opposite the first end, of the pressurisation and heating device, wherein the pressurisation and heating device is configured to be pressurised to obtain a pressure higher than atmospheric pressure inside the heating chamber when the power cable is arranged sealed in the heating chamber, wherein the pressurisation and heating device has an at least 20 cm long axially extending section which is primarily made of material at most having a conductivity of the order of 1000 S/m at 20° C.

Due to the low conductivity of material of which the axially extending section of the pressure resistant mould is made, at most only a small current is induced in the axially extending section if high frequency heating coils are arranged around the heating chamber in the axially extending section for heating a conductor of a power cable to heat an insulation system layer that is being restored. Thus, the heating of the insulation system may be concentrated to the insulation system that is being restored inside the pressurisation and heating device. The temperature profile along the axial direction may thus be optimised, resulting in less issues with the generation of waists during the curing process.

Further, the insulation system close to the axial ends inside the pressurisation and heating device may thus not heat up to temperatures that would cause it to melt or reach such a low viscosity that it is be pushed axially outwards from the pressurisation and heating device due to the pressure difference between the ambient pressure and the pressure inside the pressurisation and heating device. There is therefore a reduced risk of deformation of the insulation system.

With the term "primarily" is meant more than 50%. Thus, more than 50% of the axially extending section of the pressurisation and heating device is made of material at most having a conductivity of the order of 1000 S/m at 20° C.

The percentage of the material to the total material of the axially extending section may be by volume or by weight.

The terms "cross-linking" and "curing" are used interchangeably herein. It follows that the terms "cross-linked" and "cured" are also interchangeable.

The pressurisation and heating device may according to one example comprise more than one, such as two, at least 20 cm long axially extending section which is primarily made of material at most having a conductivity of the order of 1000 S/m at 20° C.

According to one embodiment the material at most has a conductivity of the order of 100 S/m at 20° C., such as 10 S/m at 20° C., such as 1 S/m at 20° C., such as 0.1 S/m at 20° C., such as 0.01 S/m at 20° C., such as 0.001 S/m at 20° C., such as 0.0001 S/m at 20° C.

According to one embodiment the material at most has a conductivity of the order of $10^{-4}$ S/m at 20° C., such as $10^{-5}$ S/m at 20° C., such as $10^{-6}$ S/m at 20° C., such as $10^{-7}$ S/m at 20° C., such as $10^{-8}$ S/m at 20° C., such as $10^{-9}$ S/m at 20° C., such as $10^{-10}$ S/m at 20° C.

According to one embodiment the axially extending section is at least 30 cm long, such as at least 40 cm long, such as at least 50 cm long, such as at least 60 cm long, such as at least 70 cm long, such as at least 80 cm long.

According to one example, the axially extending section may be axially centred on the pressurisation and heating device.

According to one example, the pressurisation and heating device comprises two axially offset axially extending section which are arranged symmetrically relative to the centre of the pressurisation and heating device.

According to one example, the axially extending section may be the entire axial length of the pressurisation and heating device. In this case, the pressurisation and heating device is primarily made of material at most having a conductivity of the order of 1000 S/m at 20° C.

According to one embodiment at least 70%, such as at least 80%, of the axially extending section is made of material at most having a conductivity of the order of 1000 S/m at 20° C.

According to one embodiment the material comprises fibre reinforced polymer.

The material may according to some examples comprise a polymer such as epoxy or polyamide, glass fibre, and/or carbon fibre, or a fibre reinforced polymer such as glass fibre or carbon fibre reinforced polymer, for example glass fibre or carbon fibre reinforced epoxy or polyamide.

According to one embodiment the pressurisation and heating device is configured to be pressurised to a plurality of bar, such as at least 4 bar or 400 kPa. The pressurisation and heating device may for example be configured to be pressurised to at most be 15 bar or 1500 kPa, such as at most 10 bar or 1000 kPa.

According to one embodiment the axially extending section has a wall or walls, wherein at least 80% of the wall or walls is made of material having at most a conductivity of the order of 1000 S/m at 20° C.

One embodiment comprises a heating device configured to heat the heating chamber.

One embodiment comprises a high frequency, HF, heating coil extending around the heating chamber in the axially extending section when the pressurisation and heating device is in the closed state.

The HF heating coil may be integrated with or removably arranged inside the pressurisation and heating device.

In case of two axially extending sections, the pressurisation and heating device may comprise two HF heating coils, each arranged in a respective axially extending section.

According to one embodiment the HF heating coil extends around the heating chamber at a location which is in a range of ±30% from a centre of the pressurisation and heating device measured from the first end towards the second end.

According to one embodiment the range is ±10%.

According to one embodiment the range is ±20% or ±40.

There is according to a second aspect of the present disclosure provided a heating assembly comprising the pressurisation and heating device of the first aspect, and at least one external HF heating coil configured to be arranged around the pressurisation and heating device in the axially extending section.

The heating assembly may for example comprise two external HF heating coils.

In case of two axially extending sections, each external HF heating coil may be arranged in a respective axially extending section.

There is according to a third aspect of the present disclosure provided a method of restoring an insulation system around a conductor of a power cable, using the pressurisation and heating device according to the first aspect or the heating assembly of the second aspect, the method comprising: a) placing the power cable having a restoration insulation system layer arranged around a conductor in one of the first channel and the second channel, b) setting the pressurisation and heating device in the closed state, c) pressurising the heating chamber, and d) heating the restoration insulation system layer while the heating chamber is pressurised, by outer heating inside the pressurisation and heating device and by inner heating of the restoration insulation system layer by feeding a high frequency, HF, heating coil arranged around the heating chamber in the axially extending section with current to induce a current in the conductor.

The heating may be for curing the restoration insulation system layer. This may especially be the case if the restoration insulation system layer comprises a thermosetting polymer.

The heating may be for melting the restoration insulation system layer together with the corresponding layer of the insulation system of the power cable. This is of course the case when the restoration insulation system layer comprises a thermosetting polymer, but also if the restoration insulation system layer comprises a thermoplastic such as polypropylene.

According to one embodiment the conductor has a conductor joint, wherein in step a) the restoration insulation system layer is arranged around the conductor joint in one of the first channel and the second channel.

The HF coil may be arranged at most 2-2.5 m from the conductor joint, such as 1-2 m from the conductor joint, such as 0-1 m from the conductor joint, such as 0-0.5 m from the conductor joint. The HF heating coil may according to one example be arranged axially aligned with the conductor joint.

One embodiment comprises performing steps a)-d) for each of a plurality of restoration insulation system layers.

Alternatively, all the restoration insulation system layers may be provided around the conductor and steps a)-d) are performed a single time, with step d) involving heating all the restoration insulation system layers simultaneously.

According to one embodiment in step d) the outer heating and the inner heating are performed simultaneously. The heating/curing, may thus be made more homogeneous in the radial direction.

According to one embodiment the outer heating and inner heating is performed in a noble gas atmosphere inside the heating chamber. A noble gas may thus be flowed into the heating chamber, wherein the heating is performed in the noble gas atmosphere. The noble gas has a pressure in the range of 2 bar to 15 bar, such as 4 bar-12 bar such as 4-8 bar, inside the pressurisation and heating device. Oxidisation of the insulation system layers under restoration heated in the pressurisation and heating device may thereby be eliminated or at least reduced.

Typically, the first restoration insulation system layer applied to the conductor over the conductor joint, or over a section of a conductor typically without a conductor joint in case of restoration of an insulation system of a damaged cable, is an inner semiconducting layer. In case of a restoration of the insulation system of a damaged cable, the insulation system is stripped down to the conductor similarly as during jointing before the restoration of the insulation system begins. The inner semiconducting layer comprises a polymer such as polyethylene or polypropylene, and conductive particles such as carbon black. The inner semiconducting layer may be made of a tape that is wound over the conductor such that it overlaps with the inner semiconducting layer of each of the two cable lengths that are being jointed, or with the inner semiconducting layer at both sides of stripped insulation system in case of restoring a damaged power cable. The tape may comprise a cross-linking agent. Steps a)-d) are then performed.

Next, after first insulation system layer has been heated and has cooled down, a second restoration insulation system layer is applied over the inner semiconducting layer after the pressurisation and heating device has been opened. The second restoration insulation system layer is an insulation layer which is applied such that it overlaps with the insulation layer of each of the two cable lengths that are joined or with the insulation layer at both sides of stripped insulation system in case of restoring a damaged power cable. The insulation layer comprises a polymer such as polyethylene or polypropylene. The insulation layer is typically applied by taping. The tape may comprise a cross-linking agent. Steps a)-d) are then performed.

Finally, after the second insulation system layer has been heated and has cooled down, a third restoration insulation system layer is applied over the insulation layer after the pressurisation and heating device has been opened. The third restoration insulation system layer is an outer semiconducting layer. The outer semiconducting layer comprises a polymer such as polyethylene or polypropylene, and conductive particles such as carbon black. The outer semiconducting layer may be made of a tape that is wound over the insulation layer such that it overlaps with the outer semiconducting layer of each of the two cable lengths that are being jointed or with the outer semiconducting layer at both sides of stripped insulation system in case of restoring a damaged power cable. Steps a)-d) are then performed. The insulation system of the power cable has thus been rebuilt.

Instead of taping, the restoration insulation system layers may be formed for example by means of injection moulding.

According to one embodiment the HF heating coil is fed with an alternating current with a frequency in the kilohertz range, such as 1-500 kHz, or 5-300 kHz.

According to one embodiment prior to step d) the restoration insulation system layer is an uncured insulation system layer, and wherein in step d) the outer heating and the inner heating is for curing the restoration insulation system layer.

Generally, all terms used in the claims are to be interpreted according to their ordinary meaning in the technical field, unless explicitly defined otherwise herein. All references to "a/an/the element, apparatus, component, means, etc." are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
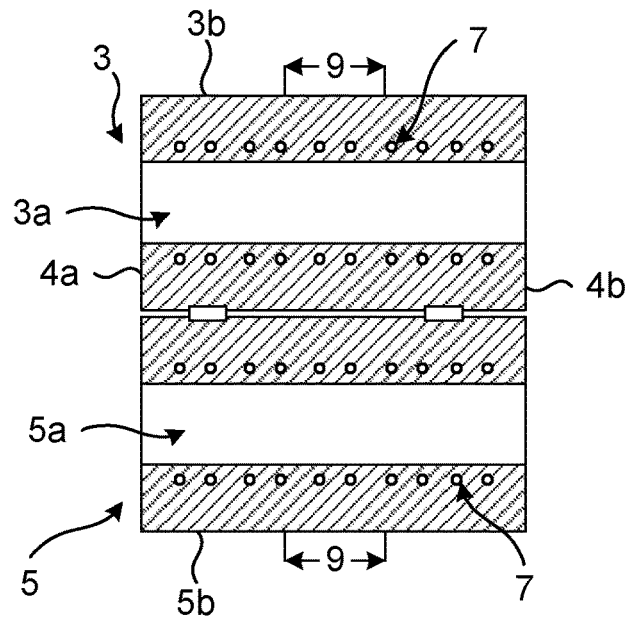
FIG. 1 schematically shows a top view of a pressurisation and heating device in an open state.

FIG. 1 schematically shows a top view of a pressurisation and heating device 1 in an open state. The pressurisation and heating device 1 is adapted for heating an insulation system layer of a power cable when restoring an insulation system of a power cable over a conductor joint or in case the power cable has been damaged. The heating may in some examples involve curing of the restoration insulation system layer. The pressurisation and heating device 1 may be suitable for heating restoration insulation system layers of medium voltage or high voltage AC or DC power cables.

The pressurisation and heating device 1 comprises a first part 3 and a second part 5.

The first part 3 has a first channel 3a extending from one end of the first part 3 to an opposite end of the first part 3. The first channel 3a is straight. The first channel 3a is configured to receive a power cable including a power cable joint.

The second part 5 has a second channel 5a extending from one end of the second part 5 to an opposite end of the second part 5. The second channel 5a is straight. The second channel 5 is configured to receive a power cable including a power cable joint.

The first part 3 and the second part 5 are configured to be assembled with each other to thereby set the pressurisation and heating device 1 in a closed state. The pressurisation and heating device 1 is thus openable and closable.

The first part 3 and the second part 5 may for example be hingedly connected, or they may be completely separable from each other.

In the closed state of the pressurisation and heating device 1, the first channel 3a faces the second channel 5a. The first channel 3a is axially aligned with the second channel 5a. The first channel 3a and the second channel 5a thus form a heating chamber extending from a first end 4a of the pressurisation and heating device 1 to a second end 4b, opposite to the first end 4a, of the pressurisation and heating device 1. The heating chamber is thus configured to circumferentially enclose the power cable including the power cable joint along the length of the pressurisation and heating device 1.

The pressurisation and heating device 1 may according to some examples comprise a heating device 7 configured to heat the heating chamber to a predefined temperature. The predefined temperature is according to some examples a curing temperature for curing a thermosetting polymer such as polyethylene. According to some examples the predefined temperature is a melting temperature for heating a thermoplastic polymer such as polyethylene until it melts. The heating device 7 may be configured to directly heat the heating chamber for example by means of heating coils or similar means arranged around the first channel 3a and the second channel 5a.

Alternatively, the heating device may be external to the pressurisation and heating device 1. In this case the heating device may be configured to externally heat gas such as noble gas introduced into the heating chamber.

The pressurisation and heating device 1 has an axially extending section 9 which is primarily made of material at most having a conductivity of the order of 1000 S/m at 20° C. The axially extending section 9 is at least 20 cm long, such as at least 30 cm long, such as at least 40 cm long.

The axially extending section 9 may according to one example be the entire length of the pressurisation and heating device 1, i.e. from the first end 4a to the second end 4b.

The material may according to examples at most have a conductivity of the order of 1000 S/m at 20° C., such as 100 S/m at 20° C., such as 10 S/m at 20° C., 1 S/m at 20° C., such as 0.1 S/m at 20° C., such as 0.01 S/m at 20° C., such as 0.001 S/m at 20° C., such as 0.0001 S/m at 20° C., such as $10^{-4}$ S/m at 20° C., such as $10^{-5}$ S/m at 20° C., such as $10^{-6}$ S/m at 20° C., such as $10^{-7}$ S/m at 20° C., such as $10^{-8}$ S/m at 20° C., such as $10^{-9}$ S/m at 20° C., such as $10^{-10}$ S/m at 20° C.

The material may for example be or comprise glass fibre or carbon fibre reinforced polymer, such as glass fibre or carbon fibre reinforced epoxy or polyamide.

In the axially extending section 9 of the pressurisation and heating device 1, the first part 3 and the second part 5 each has a wall or walls 3b, 5b of which at least 70% or at least 80% is material at most having a conductivity of the order of 1000 S/m at 20° C.

Figure 2:
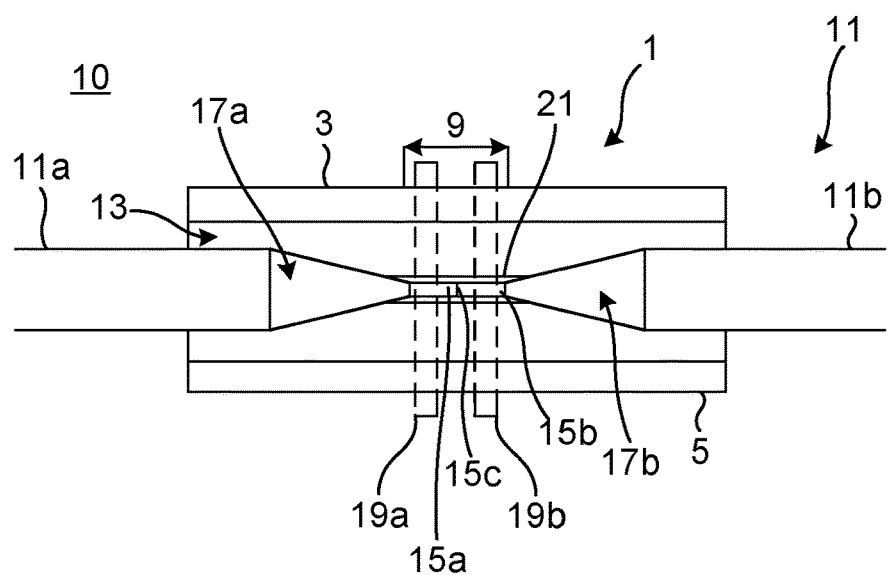
FIG. 2 shows a longitudinal section of an example of a heating assembly comprising the pressurisation and heating device in FIG. 1 while heating a restoration insulation system layer of a power cable.

FIG. 2 schematically shows a longitudinal section of a heating assembly 10 comprising the pressurisation and heating device 1 with a power cable 11, including a power cable joint, arranged inside.

The power cable 11 comprises two cable lengths 11a and 11b that are in the process of being jointed inside the pressurisation and heating device 1. The pressurisation and heating device 1 is in the closed state and the power cable 11 extends through the pressurisation and heating device 1 inside the heating chamber 13.

In the state shown in FIG. 2, the conductors 15a and 15b of the two cable lengths 11a and 11b have been jointed and a conductor joint 15c has thus been created. The two conductors 15a, 15b form a single conductor.

The jointing of the conductors 15a, 15b may for example be performed by welding, brazing or by using mechanical connectors.

Each cable length 11a, 11b has an insulation system 17a, 17b which has been shaped conically adjacent to the conductor joint 15c. A region comprising the conically shaped insulation systems 17a, 17b and the conductor joint 15c is the power cable joint.

The heating assembly 10 comprises an induction heating device. The induction heating device comprises at least one HF heating coil 19a, 19b. The at least one heating coil 19a, 19b is arranged around the axially extending section 9 of the pressurisation and heating device 1. The at least one heating coil 19a is thus arranged radially outside the axially extending section 9.

In the present example the heating assembly 10 comprises two HF heating coils 19a and 19b. Both HF heating coils 19a and 19b are arranged axially spaced apart around the axially extending section 9 of the pressurisation and heating device 1. Alternatively, if the pressurisation and heating device comprises two axially extending sections, each HF heating coil may be arranged around a respective axially extending section.

The HF heating coils 19a, 19b may be arranged symmetrically at the two sides of the conductor joint 15c. The HF heating coils 19a, 19b may thus be arranged at the same axial distance, in a respective axial direction, from the conductor joint 15c. This distance may at most be 2-2.5 m from the conductor joint 15c, such as 1-2 m from the conductor joint 15c, such as 0.8-1 m from the conductor joint 15c, such as 0.1-0.5 m from the conductor joint 15c.

If only one HF heating coil 19a is employed, it may be centred over the conductor joint 15c.

The induction heating device may comprise a power supply. The at least one HF heating coil 19a, 19b is powered by the power supply. The power supply is configured to generate an alternating current in the kilohertz range.

The induction heating device may comprise a water-cooling system configured to cool the least one HF heating coil.

Figure 3:
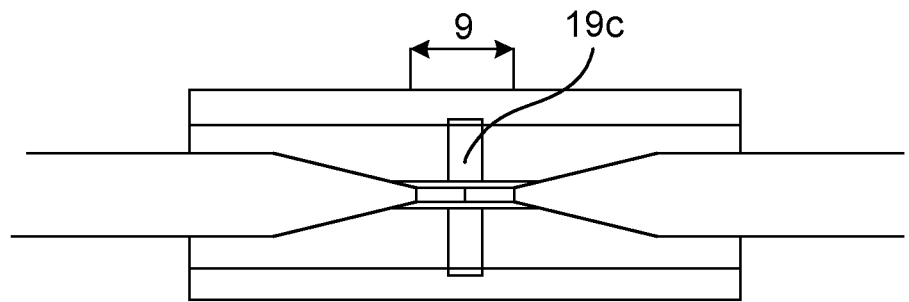
FIG. 3 shows a longitudinal section of another example of a pressurisation and heating device while heating a restoration insulation system layer of a power cable.

The at least one HF heating coil 19a, 19b may be one or more external HF heating coils, as shown in FIG. 2. In this case the at least one HF heating coil 19a, 19b may be provided around and removed from the pressurisation and heating device 1. Alternatively, the at least one HF heating coil may be integrated with the pressurisation and heating device 1. In this case, the pressurisation and heating device 1 comprises at least one HF heating coil, as shown in FIG. 3. The same considerations with respect to placement may apply as mentioned above in case the pressurisation and heating device 1 comprises one or two integrated HF heating coils.

Figure 4:
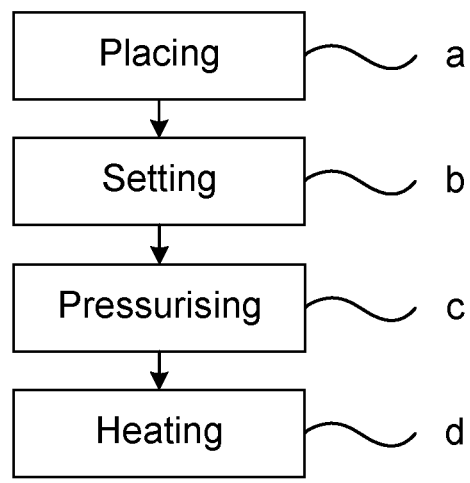
FIG. 4 is a flowchart of a method of restoring the insulation system of a power cable.

With reference to FIG. 2 and to FIG. 4, a method of restoring an insulation system around a conductor of a power cable will now be described. In the present example, the restoration of the insulation system concerns curing an uncured insulation system layer of a power cable joint, using the pressurisation and heating device 1 or the heating assembly 10. The method could also be used for restoring an insulation system of a power cable that has been damaged without involving jointing.

The joint insulation system, i.e. the insulation system around the conductor joint 15c and between the conically shaped ends of the insulation systems 17a and 17b is rebuilt layer by layer.

A first restoration insulation system layer 21 is provided around the conductor joint 15c and arranged overlappingly with the corresponding insulation layer of the insulation systems 17a, 17b at their conically shaped ends.

The restoration uncured insulation system layer 21 may for example be formed by tape wound around the exposed conductor.

In the process of heating the restoration insulation system layer 21, in a step a) the power cable joint including the conductor with the conductor joint 15c and the restoration insulation system layer 21 arranged around the conductor joint 15c is placed in one of the first channel 3 and the second channel 5.

In case of restoring the insulation system of a power cable due repair, the restoration insulation system layer is provided around the conductor.

In a step b) the pressurisation and heating device 1 is set in the closed state. The heating chamber 13 is thus formed around the power cable joint.

The pressurisation and heating device 1 may comprise sealing members such as gaskets to seal the heating chamber 13 against the power cable 11. The first part 3 and the second part 5 are sealed against each other too.

In a step c) the heating chamber 13 is pressurised. The heating chamber 13 is pressurised to a pressure higher than atmospheric pressure. The pressure is a plurality of bar, such as in a range of 4-15 bar, for example 4-10 bar.

The heating chamber 13 may be filled with noble gas during curing in conjunction with step c), to prevent oxidation while rebuilding the insulation system over the conductor joint 15c. The noble gas obtains the pressure present inside the heating chamber 13.

In a step d) the restoration insulation system layer 21 is heated. The heating typically involves curing the restoration insulation system layer 21 but could involve melting without curing in case the restoration insulation system layer 21 is made of a thermoplastic.

The heating is performed by outer heating of the restoration insulation system layer 21 inside the pressurisation and heating device 1 and by inner heating of the restoration insulation system layer 21 by feeding the at least one HF heating coil 19a, 19b, 19c arranged around the heating chamber 13 in the axially extending section 9 with current to induce a current in the conductor.

The at least one HF coil 19a, 19b may for example be openable or splittable into several parts to facilitate the placement around the power cable 11 before step d).

In case the pressurisation and heating device 1 comprises one or more sections made of a material with higher electrical conductivity than the axially extending section 9, the at least one HF heating coil 19a, 19b, 19c is placed around the axially extending section at a proper distance from the interface between the two materials.

In step d) the outer heating and the inner heating are typically performed simultaneously.

Steps a)-d) are typically performed for each of a plurality of restoration insulation system layers of the power cable joint. After each iteration, the heated insulation system layer(s) is/are cooled down to a predefined temperature such as to 60° C. or less.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A pressurisation and heating device for restoring an insulation system of a power cable, the pressurisation and heating device comprising:
   a first part including a first channel configured to receive a portion of the power cable,
   a second part including a second channel configured to receive a portion of the power cable,
   wherein the pressurisation and heating device is configured to be set in a closed state in which the first channel faces the second channel thereby forming a heating chamber extending from a first end to a second end, opposite the first end, of the pressurisation and heating device,
   wherein the pressurisation and heating device is configured to be pressurised via a gas flowed into the heating chamber, to obtain a pressure higher than atmospheric pressure inside the heating chamber when the power cable is arranged sealed in the heating chamber,
   wherein the pressurisation and heating device has an at least 20 cm long axially extending section which is primarily made of material at most having a conductivity of the order of 1000 S/m at 20° C., wherein the axially extending section is at least a portion of the pressurisation and heating device.

2. The pressurisation and heating device as claimed in claim 1, wherein the material at most has a conductivity of the order of 100 S/m at 20° C.

3. The pressurisation and heating device as claimed in claim 2, wherein the material comprises fibre reinforced polymer.

4. The pressurisation and heating device as claimed in claim 2, comprising a high frequency, HF, heating coil extending around the heating chamber in the axially extending section when the pressurisation and heating device is in the closed state.

5. The pressurisation and heating device as claimed in claim 2, wherein the material at most has a conductivity of the order of 10 S/m at 20° C.

6. The pressurisation and heating device as claimed in claim 2, wherein the material at most has a conductivity of the order of 0.0001 S/m at 20° C.

7. The pressurisation and heating device as claimed in claim 1, wherein the axially extending section is at least 30 cm long.

8. The pressurisation and heating device as claimed in claim 7, wherein the axially extending section is at least 40 cm long.

9. The pressurisation and heating device as claimed in claim 1, wherein at least 70% of the axially extending section is made of material at most having a conductivity of the order of 1000 S/m at 20° C.

10. The pressurisation and heating device as claimed in claim 9, wherein as at least 80% of the axially extending section is made of material at most having a conductivity of the order of 1000 S/m at 20° C.

11. The pressurisation and heating device as claimed in claim 1, wherein the material comprises fibre reinforced polymer.

12. The pressurisation and heating device as claimed in claim 1, comprising a high frequency, HF, heating coil extending around the heating chamber in the axially extending section when the pressurisation and heating device is in the closed state.

13. The pressurisation and heating device as claimed in claim 12, wherein the HF heating coil extends around the heating chamber at a location which is in a range of ±30% from a centre of the pressurisation and heating device measured from the first end towards the second end.

14. The pressurisation and heating device as claimed in claim 13, wherein the range is ±10%.

15. A heating assembly comprising the pressurisation and heating device as claimed in claim 1, and at least one external HF heating coil configured to be arranged around the pressurisation and heating device in the axially extending section.

16. A method of restoring an insulation system around a conductor of a power cable, using the pressurisation and heating device as claimed in claim 1, the method comprising:
   a) placing the power cable having a restoration insulation system layer arranged around a conductor in one of the first channel and the second channel,
   b) setting the pressurisation and heating device in the closed state,
   c) pressurising the heating chamber, and
   d) heating the restoration insulation system layer while the heating chamber is pressurised, by outer heating inside the pressurisation and heating device and by inner heating of the restoration insulation system layer by feeding a high frequency, HF, heating coil arranged around the heating chamber in the axially extending section with current to induce a current in the conductor.

17. The method as claimed in claim 16, comprising performing steps a)-d) for each of a plurality of restoration insulation system layers.

18. The method as claimed in claim 16, wherein in step d) the outer heating and the inner heating are performed simultaneously.

19. The method as claimed in claim 16, wherein the outer heating and inner heating is performed in a noble gas atmosphere inside the heating chamber.

20. The method as claimed in claim 16, wherein prior to step d) the restoration insulation system layer is an uncured insulation system layer, and wherein in step d) the outer heating and the inner heating is for curing the restoration insulation system layer.

\* \* \* \* \*